United States Patent [19]

Pavel

[11] Patent Number: 4,563,053
[45] Date of Patent: Jan. 7, 1986

[54] POLE MOUNTED CROSS-CONNECT TERMINAL

[75] Inventor: Laszlo Pavel, Palatine, Ill.

[73] Assignee: Reliance Electric Company, Cleveland, Ohio

[21] Appl. No.: 591,771

[22] Filed: Mar. 21, 1984

[51] Int. Cl.[4] .......................................... H01R 13/14
[52] U.S. Cl. ................................................... 339/242
[58] Field of Search .............. 339/242, 119 R, 198 R, 339/198 M, 121

[56] References Cited

U.S. PATENT DOCUMENTS 4,257,821  3/1981  Kelly et al. ...................... 339/242

OTHER PUBLICATIONS

Reliable Electric/Utility Products Telecommunications Catalog; Jan. 1982; pp. B1–B5; "Interface or Cross-Connect".
Reliable Electric/Utility Products; Strongbox; 9 pages.
Reliable Electric/Utility Products; Center Feed; 7/1983; 8 pages.

Primary Examiner—Gil Weidenfeld
Assistant Examiner—Paula Austin
Attorney, Agent, or Firm—Michael M. Rickin

[57] ABSTRACT

An arrangement of distribution and feeder field terminal blocks for mounting in an enclosure of a cross-connect terminal. The arrangement encourages and facilitates minimal routing of jumpers connecting cable pairs in the feeder field to cable pairs in the distribution field. The feeder fields are arranged in two parallel columns located substantially in the center of the enclosure. The distribution fields are located along the periphery of the enclosure in two columns and/or rows which are parallel to each other and separated from each other by the feeder fields.

10 Claims, 8 Drawing Figures

POLE MOUNTED CROSS-CONNECT TERMINAL

BACKGROUND OF THE INVENTION

1. Field of the Invention

The present invention relates to cross-connect terminals and more particularly to a pole mounted terminal in which the terminal blocks used therein are arranged in a manner so as to facilitate and encourage minimal jumper routing between blocks and also in which the cables enter the terminal in a manner so as to make dressing of the cables to either side of the pole easy and convenient.

2. Description of the Prior Art

Under certain circumstances, it may be desirable for the telephone operating company to mount a cross-connect terminal, contained in a suitable enclosure, on a pole. The terminal provides the point of interconnection between the multi-pair cable connected to the central office (C.O.) and the cable pairs connected to the local subscribers. It is also desirable that such pole mounted terminals provide for the interconnection of a large number of subscribers to the central office.

The terminal is made up of a multiplicity of terminal blocks. These blocks are arranged in two distinct groups or fields. One such group is the feeder field to which the pairs contained in the C.O. cable are connected. The other such group is the distribution field to which the subscriber cable pairs are connected. The C.O. and subscriber cable pairs are connected to the rear face of the blocks making up their respective fields.

Each block includes on its front face a multiplicity of connection points. There are two such points for each cable pair connected to the rear of the block. Jumper wires are then used to interconnect the appropriate connection points of the feeder field to the appropriate connection points of the distribution field. These jumpers allow the subscriber cable pairs to be connected to the C.O. The number of connection points in the feeder field must be at least equal to the number of connection points in the distribution field in order for a subscriber cable pair to have its own uniquely associated C.O. cable pair.

It has been recognized that it is necessary to have more connection points in the distribution field than in the feeder field. This allows some of the subscribers to have a second cable pair at their location. Over the years, the ratio of feeder connection points to distribution connection points has increased from 1:1 to 1:1.2 to 1:1.5.

With the recent introduction of the Serving Area Concept in the telephone industry, it is now preferred that the ratio be 1:2. Therefore, a cross-connect terminal embodied in accordance with the above ratio will have twice as many distribution connection points as feeder connection points. As is typically the case, identical terminal blocks are used to embody both fields. Thus the cross-connect terminal must have twice as many distribution terminals blocks as feeder terminal blocks.

The dimensions of the terminal will depend upon the total number of connection points (pairs) contained therein and the type of cross-connect block used for the feeder and distribution fields. In general, cross-connect blocks typically provide connection points for either 25 or 50 cable pairs. One such block, which provides connection points for 25 cable pairs, is the BT Series block manufactured by Assignee's Reliable Electric Division in Franklin Park, Ill. A block which provides connection points for 50 cable pairs is the quiet front type of block also manufactured by Reliable Electric. Cross-connect terminals having the ratio of 1:2 and providing connection points for a large number of pairs, such as 1800, have been manufactured using either of the block types described above.

As will be described in more detail hereinafter, those blocks are usually arranged in pad mounted terminals such that the enclosures used to house those terminals are relatively low in height but are long in length. Those dimensions give rise to a terminal, which has been found to be less intrusive to the surroundings, where such terminals are typically placed.

Pole mounted terminals present different requirements. The typical telephone pole is about 12" (about 304 mm) in diameter although the diameters of the poles may range from 8" (about 203 mm) to 16" (about 406 mm). It is, therefore, desirable that the terminal enclosure be of a width such that when mounted on the pole it does not extend appreciably beyond the pole. The narrower in width that the enclosure can be made, the more stability it will have when mounted on the pole and the easier it will be for a craftsperson to climb around it when scaling the pole.

Pole mounted cross-connect terminals have been constructed using conventional arrangements of terminal blocks. As the number of total pairs to be provided by those terminals increases above a predetermined number, such as 1000, the dimensions of the terminal becomes such that the enclosure's horizontal extent is substantially beyond each edge of the pole. When that extent is combined with the height of the enclosure required to have such a large number of pairs, the portion of the enclosure extending beyond the pole becomes a large surface area. This large surface area may then be subject to a large wind generated force and the enclosure may become unstable. In addition, the large overhanging surface area may also present an obstacle to traffic and/or pedestrians as well as become a substantial obstacle to a craftsperson attempting to climb the pole.

In addition, the enclosure may be required to be mounted on the pole either such that its entire interior is easily accessible by a craftsperson standing on the ground or at such an elevation that the craftsperson must use a lift bucket in order to access the interior. In either case, it is desirable that the length of the enclosure be more than about 5' (1524 mm). This length allows all of the terminal blocks contained therein to be easily accessed by a craftsperson, no matter where that person is standing.

For the reasons discussed, it is clear that it is not feasible to pole mount conventionally arranged terminals designed solely for pad mounting. In addition, it is also clear that even conventionally arranged terminals designed for pole mounting give rise to problems where they have to have the capacity to serve a large number of total pairs. Therefore, when the desire to have the 1:2 ratio described above is combined with the desire of the telephone company to serve as many subscribers as possible from a pole mounted cross-connect terminal, it became clear that the conventional arrangement of the blocks currently in use would not be suitable for a cross-connect terminal which has the desired characteristics of being easily and stably mounted to the pole, not an obstacle when so mounted and has its entire interior easily accessible.

In the past, it has been common for the cables to enter a pole mounted terminal either through the top or bottom of the enclosure depending on whether the cable is above or below the ground. The cable travels either down or up the pole and must then be bent away from the pole in order to enter the top or bottom of the enclosure, respectively. As the number of subscribers to be served by a pole mounted terminal increases, the number of pairs contained in the cable and its diameter both increase. This increase in cable size makes it increasingly difficult to easily bend the cable away from the pole so that it can enter the top or bottom of the enclosure. This difficulty in bending large cables also make it hard to obtain a good seal at the point at which the cable enters the enclosure. Lack of such a good seal may allow moisture to enter the enclosure. It therefore became clear that enclosures having top or bottom entry for cables would not be suitable for pole mounted terminals designed to serve a large number of subscribers.

SUMMARY OF THE INVENTION

According to one aspect of the invention there is disclosed an arrangement of feeder and distribution terminal blocks adapted for mounting in the enclosure of a cross-connect terminal.

The arrangement has a feeder field which is made up of a first column having only a single end to end array of at least one of a predetermined number of the feeder blocks and a second column also having only a single end to end array of at least one of a predetermined number of the feeder blocks. The first and second columns are mounted substantially in the center of the enclosure and parallel to each other.

The arrangement also has a distribution field which is made up of first and second groups both of which have only a single end to end array of at least one of a predetermined number of the distribution blocks. The groups are mounted parallel to each other and substantially at the periphery of the enclosure in a manner such the columns separate the groups from each other.

The first and second feeder columns have an equal number of blocks. The first and second distribution groups have an equal number of blocks. The ratio of distribution blocks to feeder blocks is greater than one to one. The feeder and distribution blocks each have terminals thereon so that they can be interconnected with jumper wires, the arrangement of feeder and distribution blocks is such that the jumper wires are never routed outside of the perimeter of the rectangle formed by the outer edges of the distribution blocks.

According to another aspect of the invention there is disclosed a cable entry means adapted for mounting on a face of a cross-connect terminal enclosure. The entry means has a mounting plate which has a generally rectangular shape and substantially ellipsoidal shaped opening in the center of the plate.

The entry means also has a cylindrical sleeve of predetermined length. The sleeve has, over much of its length, a substantially constant diameter. One end of the sleeve has a substantially ellipsoidal cross-section which is identical to the ellipsoidal shaped opening in the plate. The sleeve is integrally joined to the plate such the ellipsoidal end of the sleeve is aligned with the ellipsoidal opening in the plate.

DESCRIPTION OF THE DRAWING

FIG. 1b illustrates typical jumper routing for the arrangement shown in FIG. 1a.

FIG. 3 illustrates the arrangement shown in FIG. 2a for a cross-connect terminal having a lower total pair count than that contained in the terminal of FIG. 2a.

DESCRIPTION OF THE PREFERRED EMBODIMENTS

Figure 1A:
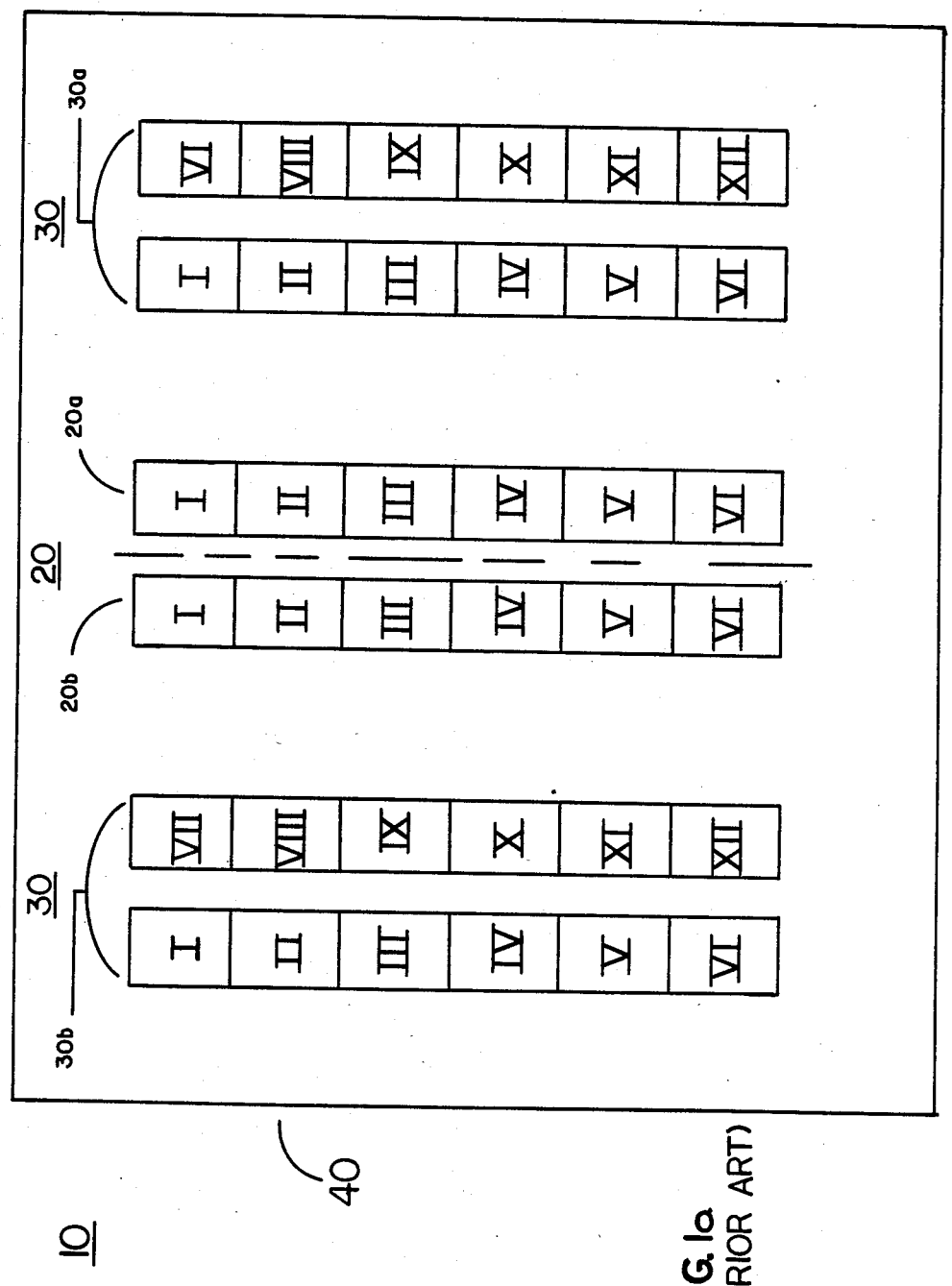
FIG. 1a illustrates a cross-connect terminal in which the feeder and distribution fields are arranged in accordance with the prior art.

Referring to FIG. 1a, there is shown a cross-connect terminal 10, which includes a feeder field 20 and a distribution field 30 arranged with respect to each other in one of the conventional manners well known in the art. The fields are housed in a suitable enclosure 40. For ease of illustration, the means by which fields 20 and 30 are mounted in the enclosure, the means to ensure proper routing for the subscriber and C.O. cable pairs and the doors of the enclosure have been omitted from FIG. 1a. All such items are well known to those skilled in the art and not relevent to the present invention.

Each of the fields 20, 30, are comprised of a multiplicity of terminal blocks. In the prior art arrangement of FIG. 1a, the feeder field terminal blocks are arranged in two parallel adjacent columns with the right hand column being designated as 20a and the left hand column being designated as 20b. The two columns are located in the center of the enclosure. The distribution field terminal blocks are arranged in two equal groups with the group designated as 30a being associated with and parallel to the feeder field 20a and the group designated as 30b being associated with and parallel to feeder field 20b. Each distribution field group is made up of two parallel adjacent columns having equal numbers of terminal blocks.

As stated above, identical terminal blocks are ordinarily used to embody the feeder and distribution fields. These blocks may be any one of a number of different types of blocks currently in use. For example, the blocks may be of the 50pair quiet front type described previously. These type of blocks provide connection for 50 cable pairs and include on their front face 50 pair or 100 total terminal connections of the recessed screw type.

For purposes of explanation, it will be assumed hereinafter that the feeder and distribution fields of terminal 10 are each embodied using 50 pair terminal blocks. It will also be assumed that cross-connect terminal 10 provides connection for 600 pairs in its feeder field. Therefore, columns 20a and 20b each include six (6) terminal blocks. The blocks in each column are identified from top to bottom by the numerals I to VI.

In order to preserve the ratio of 1:2 for feeder field to distribution field pairs described previously, the terminal 10 will have to provide connection for 1200 pairs in its distribution field. As the distribution field is arranged in two equal groups 30a, 30b; each of the groups must provide connection for 600 pairs. Each of the groups must therefore include twelve (12) terminal blocks and as each group comprises two parallel adjacent columns, then each column must include six (6) terminal blocks. The terminal blocks of each group are identified in FIG. 1a by the numerals I to XII with the block in the upper left hand corner being designated as I and the block in the lower right hand corner being designated as XII. Thus cross-connect terminal 10 will provide connection for 1800 pairs.

The size (excluding the mounting pad) of the single access enclosure 40 necessary to provide the above number of total pairs, is in order of 53" (about 1346 mm) in width, 45" (about 1143 mm) in height and 21" (about 533 mm) in depth or a volume of 50,085 cubic inches (about 820,746 cubic centimeters). Even if the total number of pairs provided is substantially reduced e.g. to 1200 pairs, the height of the enclosure is reduced to 39" (about 990 mm) but the width and depth of the enclosure remains as described above. Therefore, the prior art arrangement of feeder and distribution fields using these blocks does not give to a cross-connect terminal which can be easily and stable mounted on a telephone pole.

The cross-connect terminal may also be embodied using the 25 pair BT Series of terminal blocks described above. These blocks are conventionally arranged in a single group which includes both the feeder and distribution fields (not shown). The conventional arrangement of the 25 pair blocks to provide 1800 pairs and a ratio of 1:2 gives rise to a group which is six (6) blocks in width and 12 blocks in length or 72 blocks in total. The topmost 24 blocks of the group are considered to be associated with the feeder field while the remaining 48 lower blocks are considered to be associated with the distribution field. This 1800 pair terminal having a ratio of 1:2 requires an enclosure having dimensions (excluding any mounting pad) of 43" (about 1092 mm) in width, 54" (about 1371 mm) in height and 9" (about 228 mm) in depth. The conventional arrangement of these blocks to provide 1200 pairs and a ratio of 1:2, reduces the height of the enclosure to 46" (about 1168 mm) but the width and depth of the enclosure remain as described above. Therefore, even if the cross-connect terminal is embodied using the types of 25 pair blocks set forth above, the prior art arrangement of these blocks does not give rise to a terminal which can be easily and stably mounted on a pole without adding support hardware in addition to the standard hardware used to mount the terminal to the pole. In fact, the right and left hand edges of the enclosure each extend beyond the typical pole by 15.5" (about 394 mm).

Figure 1B:
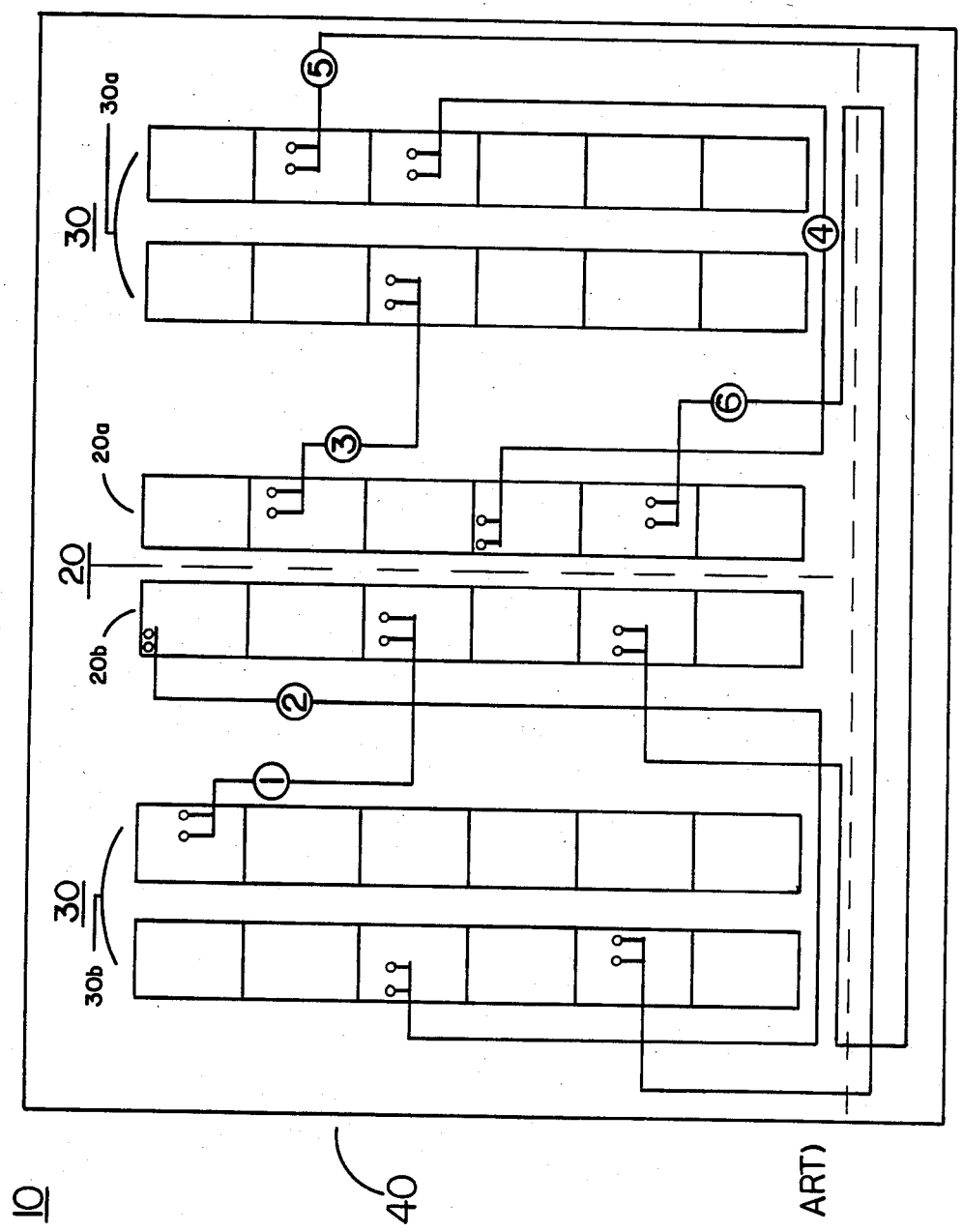

Referring to FIG. 1b, there is shown typical routing for the cross-connect terminal 10 of FIG. 1a for six different jumper connections between the feeder and distribution fields. Each of the jumpers are identified by the number 1 to 6. The requirements that must be observed by a craftsperson in connecting the jumpers are that jumpers should never cross over between adjacent blocks and that jumpers should never cross over the center line between columns 20a and 20b of the feeder field. The reason for the latter requirement is that the terminal blocks are mounted in the enclosure on two hinged panels (not shown). The blocks of column 20a and group 30a are mounted on one panel which is hinged on its right hand side; whereas, the blocks of column 20b and group 30b are mounted on the other panel which is hinged on its left hand side. The panels may then be rotated outward about the center line between columns 20a and 20b to thereby expose the backs of the blocks. This allows the blocks to be stubbed in the fields. The panels are hinged in the manner described above, even if the terminal is prestubbed in the factory.

The typical jumper routing shown in FIG. 1b will now be described. The identifying numbers on the blocks have been omitted for FIG. 1b for ease of illustration. Jumper 1 interconnects a subscriber cable pair on block VII of group 30b to a C.O. cable pair on block III of column 20b. Jumper 2 interconnects a C.O. cable pair in the top left most corner of block I of group 20b to a subscriber cable pair in block III of group 30b. By established custom in the telephone industry, the top left most pair in any block is always designated as pair number 1. Jumper 3 connects a C.O. cable pair on block II of column 20a to a subscriber cable pair on block III of group 30a. Jumper 4 interconnects C.O. pair number 1 of block IV of column 20a to a subscriber cable pair in block IX of group 30a.

Jumpers 5 and 6 require a slightly different routing than the jumpers described above. They interconnect a C.O. cable pair located in column 20a or 20b with a subscriber cable pair located in group 30b or 30a respectively. As the jumpers are prohibited from crossing the center line between columns 20a/20b, they must be routed through a channel (shown) by the dotted line which is located at the bottom of the enclosure. The channel includes rings to contain the jumpers and is located below the hinged panels. Therefore, the routing of jumpers 5 and 6 does not interfere with the ability to access the rear of the blocks. Similar jumper routing channels are located between column 20a and group 30a; column 20b and group 30b; below the columns and groups but on the hinged panels and to the right of group 30a and the left of group 30b. For ease of illustration these channels have not been shown in FIGS. 1a and b. These channels also include rings to contain the jumpers.

The above examples show that even if the jumper routing is planned by the telephone company in advance of installation, it will still be necessary for some of the jumpers to be routed below the blocks making up groups 30a and 30b. As subscribers relocate and/or change their service, a craftsperson must change the appropriate jumper connection and/or install a new connection. Eventually, the number of jumpers routed below the blocks increases making it difficult for a craftsperson to identify a particular jumper.

If terminal 10 were embodied using the 25 pair blocks described above then the requirements placed on a craftsperson in connecting the jumpers would depend on whether or not the terminals are prestubbed in the factory. If the terminal is unstubbed then the craftsperson cannot have the jumpers cross over the center line between adjacent blocks in both the distribution and feeder portions of the group of blocks in the terminal. This requirement is imposed in order that the two panels on which the blocks are located may be rotated outwards about the centerline to allow access to the rear of the blocks for field stubbing. If the terminal is prestubbed in the factory then the craftsperson is allowed to have jumpers cross the centerline in the distribution part of the group but not in the feeder part. The restriction on not crossing the centerline in the feeder part is imposed in order that the jumpers be easily identifiable.

Figure 2A:
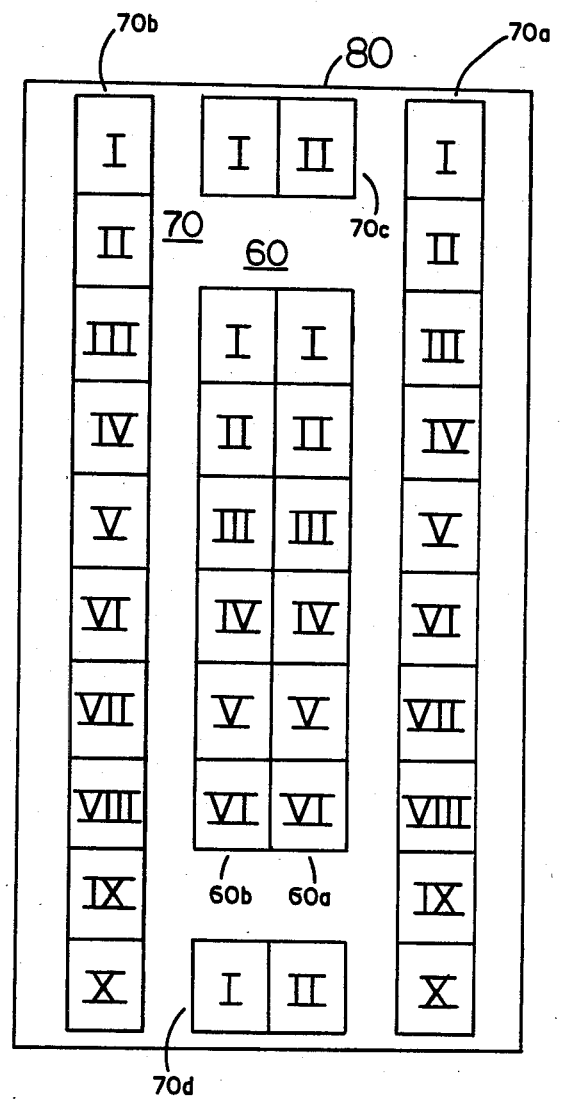
FIG. 2a illustrates a cross-connect terminal in which the feeder and distribution fields are arranged in accordance with the present invention.

Referring to FIG. 2a, there is shown a cross-connect terminal 50 wherein the terminal blocks comprising the feeder and distribution fields are arranged with respect to each other in accordance with the present invention. Terminal 50 includes a feeder field 60 and a distribution field 70. The fields are housed in a suitable enclosure 80 and for the reasons given with respect to enclosure 40, FIG. 2a omits the means by which the fields are mounted in the enclosure, the cable pairs routing means and a suitable hinged door or cover for the enclosure. As will be described in more detail, hereinafter, the arrangement of the fields in accordance with the present invention allows terminal 50 to be easily and stably mounted on a telephone pole.

Each of the fields 60, 70 of terminal 50 are comprised of a multiplicity of terminal blocks. In a manner identical to that of terminal 10, the feeder field terminal blocks are arranged in two parallel adjacent columns 60a, 60b and are located substantially in the center of the enclosure. For ease of explanation and comparison with FIG. 1a, it will be assumed that the feeder field 60 is embodied using the same 50 pair blocks described in connection with that figure.

The terminal blocks of the distribution field 70 are arranged in a manner different from the distribution field terminal blocks of terminal 10. In terminal 50 the distribution field terminal blocks are arranged in a plurality of groups whose number does not exceed two. One of these groups comprises the two single columns 70a, 70b of one or more terminal blocks each. The blocks of column 70a are adjacent to the right edge of the enclosure and are parallel to the blocks of column 60a. The blocks of column 70b are adjacent to the left hand edge of the enclosure and are parallel to blocks of column 60b.

The other of these groups comprise the two single rows 70c, 70d of one or more terminal blocks each. The blocks of row 70c are parallel to and adjacent to the top of the enclosure. The blocks of row 70d are parallel to and adjacent to the bottom of the enclosure. For ease of explanation and comparison with FIG. 1a, it will be assumed that the distribution field 70 is embodied using the same fifty pair blocks used to embody the feeder field.

The advantages provided by the arrangement of the field of the present invention will now be described. In order to provide a comparison with the prior art arrangement of FIG. 1a, it will be assumed that terminal 50 provides connection points for 1800 pairs in the same 1:2 ratio described for terminal 10. In that regard, each of columns 60a and 60b are made up of six terminal blocks. The blocks in each column are numbered I to VI from top to bottom.

In order to provide connections for 1200 pairs and at the same time facilitate and encourage minimal jumper routing as well as fit into an enclosure which is suitable for mounting on a pole; columns 70a, 70b are comprised of ten terminal blocks each and rows 70c, 70d are comprised of two terminal blocks each. The blocks in each column are identified from top to bottom by the numerals I to X and the blocks in each row are identified from left to right by the numerals I to II.

In a cross-connect terminal embodied as shown in FIG. 2a, the enclosure needed to provide the 1800 pairs is 32" (about 813 mm) in width, 62" (about 1575 mm) in height (length) and 12" (about 305 mm) in depth or a volume of 23,808 cubic inches (about 390,143 cubic centimeters). Therefore, the arrangement of the terminal blocks in accordance with the present invention has given rise to a terminal which is able to provide the same number of connection pairs as terminal 10 but in contrast to that terminal is capable of being easily and stably mounted on a pole (without additional support hardware) and yet has an interior which is readily accessible by a craftsperson. In addition, terminal 50 does not present an obstacle to a craftsperson climbing the pole, does not expose a large surface outside of the pole for wind pressure, and does not present an obstacle to vehicular or pedestrian traffic. The right and left hand edges of the enclosure each extend beyond the typical pole by only 10" (about 255 mm).

Figure 2B:
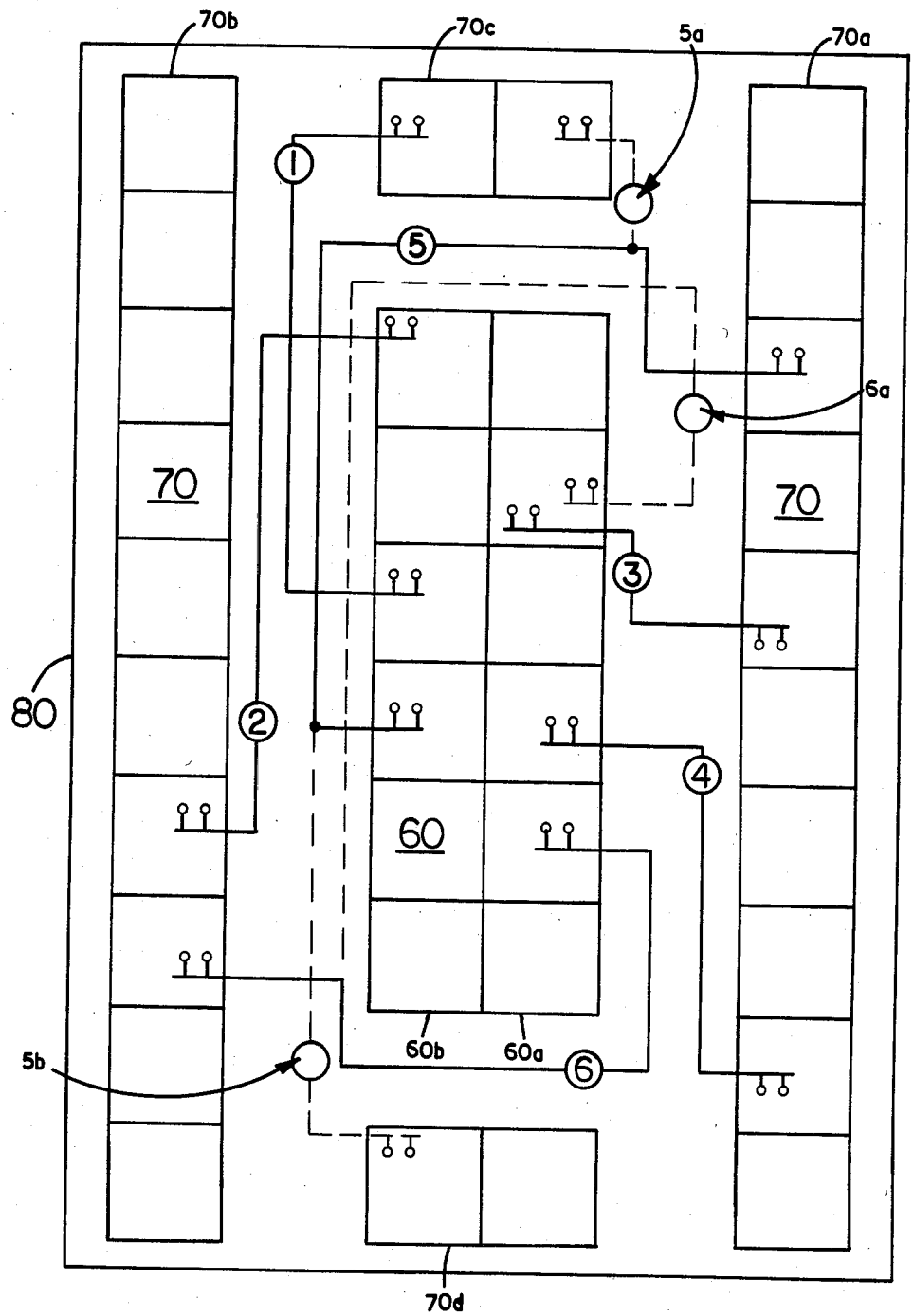
FIG. 2b illustrates typical jumper routing for the arrangement shown in FIG. 2b.

In FIG. 2b, there is shown the typical routing for the cross-connect terminal 50 of FIG. 2a for a number of different jumper connections between the fields. When terminal 50 is installed at a location which did not previously have telephone service, such as a newly developed shopping center, the telephone operating company can plan the jumper connections such that they are the minimal possible length. The arrangement of the fields in terminal 50 allows for the minimal possible length to be attained. In contrast, the arrangement of the distribution field in two groups of two columns each in the terminal block of FIG. 1a, does not allow that minimal possible length to be attained nor does that terminal ever facilitate the same.

Referring now to FIG. 2b, there is shown the jumper routing for six jumpers which are essentially equivalent to the six jumpers shown in FIG. 1b. As will be described in more detail, hereinafter, some of those six jumpers are the minimal lengths necessary to accomplish the desired interconnection. Others of the jumpers are longer than the minimal length and have been shown in order to represent the way a typical terminal will look after it has been necessary to change interconnections as subscribers and/or their services change.

Jumpers 1, 2, 3, and 4 represent essentially minimal length interconnections between their C.O. cable pairs located in columns 60a or 60b and their associated cable pairs located in the associated row or column of distribution field 70.

Jumper 5 represents an interconnection between a C.O. cable pair of block IV of column 60b with a subscriber cable pair of block III of column 70a. As seen in FIG. 2b, the present invention allows this interconnection to be made by routing the jumper above the tops of columns 60a, 60b. This routing is within the rectangular plane formed by the outside edges of columns 70a, 70b and rows 70c, 70d. This should be contrasted with the routing shown for jumper 5 in FIG. 1b. In the conventional arrangement of blocks, jumper 5 must be routed along the bottom of the enclosure 40 which is outside of the rectangular surface formed by the bottom and top edges of columns 20a, 20b and the right and left outside edges of blocks VI to XII of groups 30a and 30b.

If instead of the interconnection described above jumper 5 was used to interconnect the C.O. cable pair of block IV with a subscriber cable pair of block II of row 70c, the routing would be as shown in FIG. 2b by the dotted line designated as 5a. The routing for jumper 5a is still above the top edge of columns 60a, 60b. If jumper 5 was used to interconnect the same C.O. cable pair to a subscriber cable pair on block I of row 70d, the routing would be as shown by the dotted line designated as 5b. The routing for jumper 5b would be below the bottom edge of columns 60a, 60b but inside the rectangle defined by columns 70a, 70b and rows 70c, 70d.

Jumper 6 represents an interconnection between a C.O. cable pair located on block V of column 60a and a subscriber cable pair located on block VIII of column 70b. The present invention allows this interconnection to be made by routing the jumper below the bottom edges of columns 60a, 60b but still within the rectangular surface described above. This should be contrasted with the routing shown for jumper 6 shown in FIG. 1b. In the conventional arrangement of blocks, jumper 6 must be routed along the bottom of the enclosure outside of the rectangular surface formed by the outside edges of the columns and groups. This is the same path that jumper 5 must take.

If instead of the routing described above, jumper 6 was used to interconnect the subscriber cable pair of block VIII of column 70b to block II of column 60a, the jumper, if desired, could be routed above the top edges of columns 60a, 60b as shown by the dotted line designated by 6a. For that interconnection the jumper might just as easily be routed (not shown) along the bottom edge of columns 60a, 60b. The choice for the routing would be left to a craftsperson. This is in contrast to the prior art arrangement of FIGS. 1a, b, wherein the craftsperson cannot select the routing.

Figure 3:
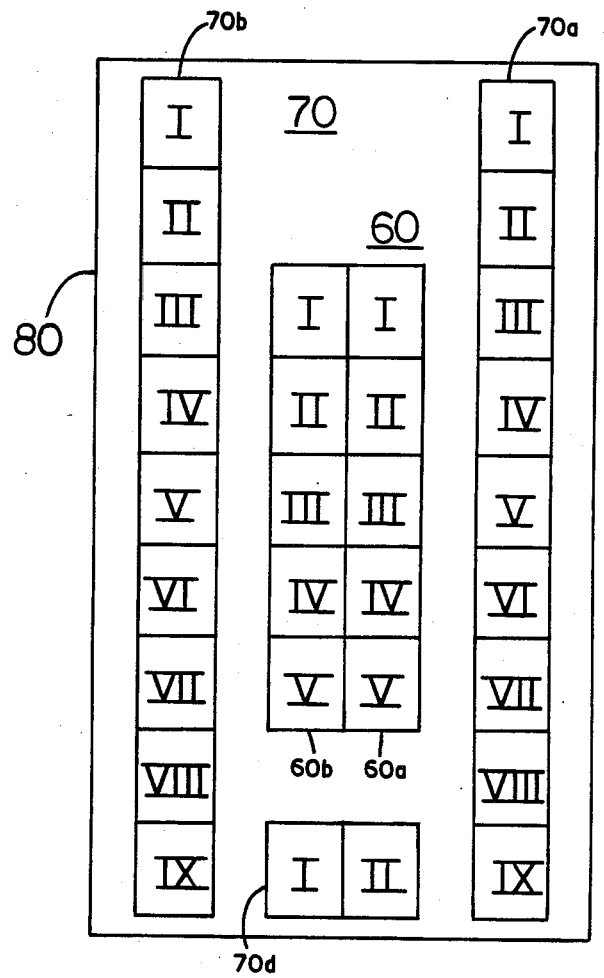

Referring now to FIG. 3, there is shown an arrangement of the distribution field in accordance with the present invention which allows terminal 50 to provide connections for 1500 pairs. Once again it is assumed that the terminal blocks are embodied using 50 pair blocks and that the ratio of feeder field connection points to distribution field connection points is 1:2. Therefore, the feeder field provides connection points for 500 pairs and the distribution field provides connection points for 1000 pairs.

In a manner similar to that shown in FIG. 2a, the feeder field is arranged in two parallel columns 60a, 60b each of which consist of five terminal blocks numbered I to V from top to bottom. The distribution field is arranged in two columns 70a, 70b and one row 70d. Although the single row 70d has been shown in FIG. 3 as adjacent to the bottom edge of enclosure 80, it should be appreciated that it can be located adjacent to the top edge of the enclosure. Columns 70a, 70b each consist of nine terminal blocks and row 70d consists of two terminal blocks. The terminal blocks of columns 70a, 70b are numbered I to IX from top to bottom and the terminal blocks of row 70d are numbered I to II from right to left.

For the cross-connect terminal 50 of FIG. 3, the size of the enclosure needed to provide the 1500 pairs is 32" (about 813 mm) in width, 56" (about 1422 mm) in height and 11" (about 280 mm) in depth. The dimensions of an enclosure embodied in accordance with the prior art to provide the same number of total pairs is identical in width and depth for that given in connection with FIG. 1a for 1800 pairs. The only difference is that the height of the enclosure is reduced to 51" (about 1295 mm). Therefore, the present invention allows a 1500 pair terminal to be embodied in a manner such that it may easily and stably mounted with conventional hardware on a pole. The present invention also allows for the minimal jumper routing described in connection with FIG. 2b.

Figure 4:
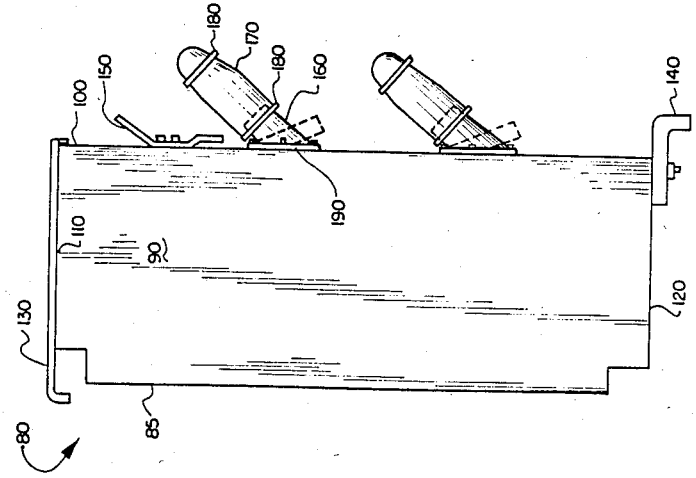
FIG. 4 illustrates a right side view of the enclosure shown in FIGS. 2a, 2b and FIG. 3.

Referring to FIG. 4 there is shown a right side view of the enclosure 80 of FIGS. 2a and 2b, in which in accordance with another aspect of the present invention, the cable pairs enter the enclosure through the rear face. Enclosure 80 is essentially rectangular in shape and includes a front face 85, a right side 90, a rear face 100, top and bottom faces 110 and 120, respectively, and a left face (not shown). Attached to and part of the top face 110 is a rainguard 130.

Attached to the center of the bottom face is a support bracket 140. Attached to the rear face 100 are two bracket clips 150 only one of which is shown in FIG. 4. As is well known in the art, the bracket clips 150 and the bottom support bracket 140 are the hardware which is conventionally used to mount the terminal to the telephone pole. The hardware (not shown) into which the support bracket and the bracket clips mate are mounted on the pole.

In accordance with the present invention there is also mounted on the rear face of the enclosure a multiplicity of angled sleeves 160 which allow for entry of the multi-pair cables from the pole into the enclosure. The sleeves each have a circular cross section except at the end 165 (see FIG. 5b) of the sleeve which mates with its integral mounting plate 190. At that end the sleeve is ellipsoidal in cross-section. The sleeve may be thought of as a piece of cylindrical pipe in which one end has been cut in a manner which allows the sleeve to be at an angle to the rear face of the enclosure. Side and front views of the sleeve and its mounting plate are shown in FIGS. 5a and 5b to be described in more detail hereinafter.

As shown in FIG. 4 the sleeves are pointing towards the top of the enclosure, i.e. up. This would be the direction the sleeves would point if the cables entering the enclosure were coming down the pole. The sleeves may also be mounted on the enclosure such that they point towards the bottom of the enclosure, i.e. down, to thereby allow cables coming up the pole to enter the enclosure. This is shown in FIG. 4 by the dotted lines for the sleeves. In fact, when the terminals are shipped from the factory the sleeves point down. They have been shown pointing up in FIG. 4 for ease of illustration.

Mounted on each sleeve is a tapered nozzle 170 which is used to cover the sleeve when the terminals are shipped from the factory unstubbed. Included with each tapered nozzle 170 are two hose clamps 180, the lower one of which clamps the nozzle to the sleeve and the upper one of which is used to clamp the nozzle to the cable to be inserted therein. To install the cable in the field the craftsperson cuts off the tapered end of the nozzle at a point which is dependent on the thickness of the cable. The cable is then inserted in the nozzle and pushed through the sleeve to appear at the rear of the terminal blocks. After all necessary wiring has been completed the nozzle is reseated, if necessary, on the sleeve and the hose clamps are tightened to provide a water tight fit. The terminals may also be shipped pre-stubbed from the factory. In that case the craftsperson would splice the pairs of the stub to the appropriate pairs of the cable on the pole.

Figure 5B:
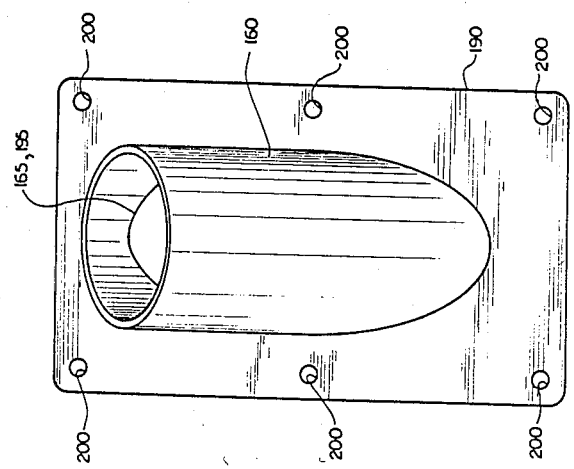
FIGS. 5a and 5b show front and side views, respectively, of the cable sleeve and associated mounting plate shown in FIG. 4.
Figure 5A:
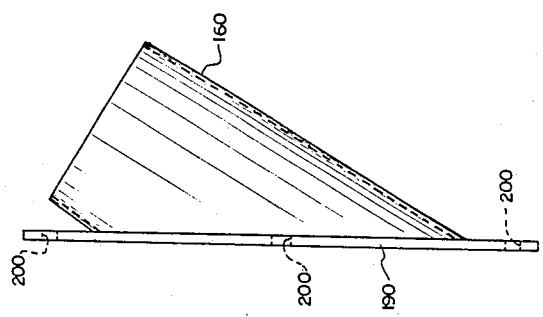

Referring to FIGS. 5a and 5b there are shown side and front views of the sleeve 160 and its associated rectangular mounting plate 190. The sleeve may be welded to the plate or the entire piece (sleeve and plate) may be die or sand cast, if it is desired that the piece be producable in volume. As shown in FIG. 5b the mounting plate includes six (6) mounting holes 200 by which the plate and sleeve may be affixed by nuts and bolts (not shown) to the rear of the enclosure. The mounting plate also has substantially in its center an ellipsoidal shaped opening 195 which is identical to the ellipsoidal cross-section of the sleeve. A liquid gasket, such as silicone, is typically used to seal the plate to the enclosure. The rear of the enclosure includes an opening for receiving the cable and six holes which align with the mounting holes on the plate.

As described above, the sleeve and mounting plate may be affixed to the enclosure such that the sleeve points either up or down. The plate is designed in a manner such that the sleeve may be mounted in either direction using the same mounting holes on the rear of the enclosure. The change in direction is accomplished simply by rotating the plate 180° before it is mounted to the enclosure.

For the 1800 pair terminal described above, the diameter of the sleeve is 4" (about 101 mm). A sleeve of this diameter is capable of accomodating up to a 1200 pair cable. There are up to four such sleeves in the 1800 pair enclosure. The four sleeves are arranged on the rear of the enclosure in upper and lower groups of two sleeves each. The upper group is that pair of sleeves which is closer to the top face 110 of the enclosure while the lower group is that pair of sleeves which is closer to the bottom face 120. In FIG. 4 only one sleeve in each group has been shown.

The two sleeves in each group are mounted on the rear face such that when the enclosure is mounted on the pole the sleeves come as close as is possible to the outer edges of the pole. As telephone poles may be up to 16" (about 406 mm) in diameter the sleeves of each group must be mounted at least that far apart. The distance between the mounting plate of an upper sleeve and its associated lower sleeve is such that the cables enter the rear of the enclosure near the outer edges of the feeder field.

While the sleeve has been shown in FIGS. 4, 5a and 5b to have an angle of about 30° with respect to the rear face of the enclosure, it should be appreciated that the angle the sleeve makes with the rear face can be lesser or greater than 30°. It should also be appreciated that while a sleeve having a diameter of 4" has been described, that sleeves having smaller diameters such as 3" (about 76 mm) can be used with pole mounted terminals having pair counts below 1800. It should further be appreciated that while mounting plate 190 has been shown to have six holes for mounting, for smaller diameter sleeves (such as 3") the number of mounting holes can be reduced to four (4). It should also be appreciated that if a particular cable receiving opening on the rear of the enclosure is not to be used then it is covered by a solid, flat mounting plate.

Finally it should be appreciated that while enclosure 80 has been shown to be substantially rectangular in shape, the enclosure may take on any shape which allows for the arrangement of the feeder and disribution fields in accordance with the present invention. It should also be appreciated that while the present invention has been described in connection with feeder and distribution fields which have been embodied using one kind of identical terminal blocks, that it is the arrangement of the fields with respect to each other which is important to the present invention and not the types of blocks used to embody the fields.

It is to be understood that the description of the preferred embodiments are intended to be only illustrative, rather than exhaustive, of the present invention. Those of ordinary skill will be able to make certain additions, deletions, and/or modifications to the embodiments of the disclosed subject matter without departing from the spirit of the invention or its scope, as defined by the appended claims.

What is claimed is:

1. An arrangement of feeder and distribution terminal blocks adapted for mounting in the enclosure of a cross-connect terminal comprising:
   (a) feeder field means comprising:
     (i) a first column having only a single end to end array of a predetermined number of said feeder blocks;
     (ii) a second column having only a single end to end array of a predetermined number of said feeder blocks;
     said first and second columns being mounted substantially in the center of said enclosure, parallel to each other and having an equal predetermined number of said feeder blocks; and
   (b) distribution field means comprising:
     (i) a first group having only a single end to end array of a predetermined number of said distribution blocks;
     (ii) a second group having only a single end to end array of a predetermined number of said distribution blocks;
     said first and said second groups being mounted parallel to each other and substantially at the periphery of said enclosure in a manner such that said columns separate said groups from each other, said groups having an equal predetermined number of said distribution blocks, the ratio of said distribution blocks predetermined number to said feeder blocks predetermined number being greater than one to one;
     said feeder and said distribution blocks each having terminals thereon for interconnection with each other by jumper wires routed therebetween, said arrangement being such that said jumper wires are never routed outside of the perimeter of the rectangle formed by the outer edges of said distribution blocks to thereby allow for minimum routing of said jumper wires.

2. The arrangement of claim 1 wherein said feeder and said distribution blocks are identical in structure and the ratio of said distribution blocks predetermined number to said feeder blocks predetermined number lies between one to one and two to one.

3. The arrangement of claim 1 wherein said distribution field further includes a third group having only a single end to end array of at least one of a predetermined number of said distribution blocks, said third group being mounted at a substantially right angle to said first and second groups and at substantially said enclosure periphery.

4. The arrangement of claim 3 wherein said distribution field further includes a fourth group having only a single end to end array of at least one of a predetermined number of said distribution blocks; said fourth group being mounted at substantially said periphery and parallel to said third group and said predetermined number of said third group being equal to said predetermined number of said fourth group.

5. The arrangement of claim 1 wherein said distribution field further includes:

(i) a third group having only a single end to end array of at least one of a predetermined number of said distribution blocks; and (ii) a fourth group having only a single end to end array of at least one of a predetermined number of said distribution blocks;

said third and said fourth groups being mounted parallel to each other and perpendicular to said first and said second groups and substantially at the periphery of said enclosure in a manner such that said columns separate said third and said fourth groups from each other.

6. The arrangement of claim 5 wherein said first column and said second column have an equal predetermined number of said feeder blocks; said first group and said second group have an equal predetermined number of said distribution blocks; said third group and said fourth group have an equal predetermined number of said distribution blocks; said feeder and said distribution blocks being identical in structure, and the ratio of the sum of said first and second groups predetermined number and said third and fourth group predetermined number to said feeder blocks predetermined number lies between one to one and two to one.

7. An arrangement of feeder and distribution terminal blocks adapted for mounting in the enclosure of a cross-connect terminal comprising:

(a) feeder field means comprising:
   (i) a first column having only a single end to end array of at least one of a predetermined number of said feeder blocks;
   (ii) a second column having only a single end to end array of at least one of a predetermined number of said feeder blocks;
   said first and said second columns being mounted substantially in the center of said enclosure and parallel to each other; and (b) distribution field means comprising:
   (i) a first group having only a single end to end array of at least one of a predetermined number of said distribution blocks;
   (ii) a second group having only a single end to end array of at least one of a predetermined number of said distribution blocks;
   (iii) a third group having only a single end to end array of at least one of a predetermined number of said distribution blocks;
   said first and said second groups being mounted parallel to each other and substantially at the periphery of said enclosure in a manner such that said columns separate said groups from each other and said third group being mounted at a substantially right angle to said first and said second groups and also at substantially said periphery.

8. The arrangement of claim 7 wherein said first column and said second column have an equal predetermined number of said feeder blocks; said first group and said second group have an equal predetermined number of said distribution blocks; said feeder and said distribution blocks being identical in structure and the ratio of the sum of said first and second group predetermined number and said third group predetermined number to said feeder blocks predetermined number lies between one to one and two to one.

9. The arrangement of claim 7 wherein said distribution field further includes a fourth group having only a single end to end array of at least one of a predetermined number of said distribution blocks, said fourth group being mounted at substantially said periphery and parallel to said third group.

10. The arrangement of claim 9 wherein said first column and said second column have an equal predetermined number of said feeder blocks; said first group and said second group have an equal predetermined number of said distribution blocks; said third group and said fourth group have an equal predetermined number of said distribution blocks; said feeder and said distribution blocks being identical in structure, and the ratio of the sum of said first and second groups predetermined number and said third and fourth group predetermined number to said feeder blocks predetermined number lies between one to one and two to one.

* * * * *